US009118476B2

(12) United States Patent
Sebire et al.

(10) Patent No.: US 9,118,476 B2
(45) Date of Patent: Aug. 25, 2015

(54) TRANSMISSION CONTROL METHOD

(75) Inventors: Benoist Sebire, Beijing (CN); Karri Ranta-Aho, Espoo (FI)

(73) Assignee: SISVEL INTERNATIONAL S.A., Luxembourg (LU)

( * ) Notice: Subject to any disclaimer, the term of this patent is extended or adjusted under 35 U.S.C. 154(b) by 461 days.

(21) Appl. No.: 11/221,787

(22) Filed: Sep. 9, 2005

(65) Prior Publication Data

US 2006/0215560 A1 Sep. 28, 2006

(30) Foreign Application Priority Data

Mar. 24, 2005 (FI) ...................................... 20050321
Apr. 4, 2005 (FI) ...................................... 20050344

(51) Int. Cl.
*H04L 1/00* (2006.01)
*H04L 1/18* (2006.01)
*H04W 28/04* (2009.01)

(52) U.S. Cl.
CPC ............. *H04L 1/1812* (2013.01); *H04W 28/04* (2013.01)

(58) Field of Classification Search
None
See application file for complete search history.

(56) References Cited

U.S. PATENT DOCUMENTS

| 7,099,289 | B2 * | 8/2006 | Varma | 370/278 |
| 2003/0123470 | A1 * | 7/2003 | Kim et al. | 370/437 |
| 2004/0137930 | A1 | 7/2004 | Kim et al. | |
| 2004/0196826 | A1 | 10/2004 | Bao et al. | |
| 2004/0240400 | A1 * | 12/2004 | Khan | 370/280 |
| 2004/0240424 | A1 * | 12/2004 | Fong et al. | 370/349 |
| 2005/0201283 | A1 * | 9/2005 | Yoon et al. | 370/232 |
| 2005/0201325 | A1 | 9/2005 | Kang et al. | |
| 2005/0238053 | A1 * | 10/2005 | Iochi et al. | 370/473 |
| 2007/0183451 | A1 * | 8/2007 | Lohr et al. | 370/473 |
| 2008/0133995 | A1 | 6/2008 | Lohr et al. | |
| 2008/0212541 | A1 | 9/2008 | Vayanos et al. | |
| 2009/0323592 | A1 | 12/2009 | Terry | |

FOREIGN PATENT DOCUMENTS

| EP | 1286491 | 2/2003 |
| JP | 11008582 A | 1/1999 |
| JP | 2003143158 A | 5/2003 |
| WO | WO 2004/062205 | 7/2004 |
| WO | WO 2004/102980 | 11/2004 |

OTHER PUBLICATIONS

International Preliminary Report on Patentability application No. PCT/IB2006/000901 filed Mar. 20, 2006.
NEC-XP 002389835, "Content of E-AGCH", Feb. 14, 2005, pp. 1-2.
Amitava Ghosh, et al., "Overview of Enhanced Uplink for 3GPP W-CDMA", 2004, pp. 2261-2265.

(Continued)

*Primary Examiner* — Khalid Shaheed
*Assistant Examiner* — Shantell L Heiber
(74) *Attorney, Agent, or Firm* — Squire Patton Boggs (US) LLP

(57) ABSTRACT

This invention relates to signalling of control information related to retransmissions in a wireless communication network. According to one aspect of the invention, a method for controlling transmission over a wireless communication link is provided. The method comprises the step of indicating on a transmission resource control channel whether a HARQ retransmission process in a mobile station should be activated or deactivated.

15 Claims, 2 Drawing Sheets

(56) References Cited

OTHER PUBLICATIONS

3GPP TS 25.848 V.4.0:0 (Mar. 2001), "3rd Generation Partnership Project, Technical Specification Group Radio Access Network, 6.3 Hybrid ARQ (H-ARQ), Physical Layer Aspects of Utra High Speed Downlink Packet, Access (Release 4)," Mar. 2001, 1 page, Valbonne, France.

3GPP TR 25.896 V6.0.0 (Mar. 2004), "3rd Generation Partnership Project; Technical Specification Group Radio Access Network; Feasibility Study for Enhanced Uplink for UTRA FDD (Release 6)," Mar. 2004, pp. 1-179, Valbonne, France.

3GPP TR 25.808 V6.0.0 (Mar. 2005), "3rd Generation Partnership Project; Technical Specification Group Radio Access Network; FDD Enhanced Uplink Physical Layer Aspects (Release 6)," Mar. 2005, pp. 1-26, Valbonne, France.

3GPP TS 25.309 V6.3.0 (Jun. 2005), 3rd Generation Partnership Project; Technical Specification Group Radio Access Network; FDD Enhanced Uplink; Overall description; Stage 2 (Release 6), Jun. 2005, pp. 1-33, Valbonne, France.

3GPP TS 25.319 V8.0.0 (Dec. 2007), "3rd Generation Partnership Project, Technical Specification Group Radio Access Network, Enhanced Uplink, Overall Description, Stage 2 (Release 8)," Dec. 2007, pp. 1-52, Valbonne, France.

3GPP TS 25.321 V6.3.0 (Dec. 2004), Technical Specification, 3rd Generation Partnership Project; Technical Specification Group Radio Access Network; Medium Access Control (MAC) protocol specification (Release 6), Dec. 2004, pp. 1-73, 3GPP, Valbonne, France.

English Translation of Notification of Reason(s) for Refusal, Japanese Patent Application No. 2008-502512, Drafting Date: Nov. 25, 2009, Dispatch Date: Dec. 7, 2009, 1 page.

Japanese Office Action, Japanese Application No. 2008-502512, Date of Completion: Apr. 5, 2010, pp. 1-3, English Translation: pp. 1-3.

* cited by examiner

TRANSMISSION CONTROL METHOD

FIELD OF INVENTION

This invention relates to signalling of control information related to retransmissions in a wireless communication network.

| List of acronyms | |
|---|---|
| AG | Absolute Grant |
| CDMA | code division multiple access |
| DL | downlink |
| E-AGCH | EDCH Absolute Grant Channel |
| EDCH | Enhanced Uplink DCH |
| E-RGCH | EDCH Relative Grant Channel |
| HARQ | Hybrid Automatic Repeat reQuest |
| HSUPA | High Speed Uplink Packet Access |
| Node B | Base station |
| RG | Relative Grant |
| RLC | Radio Link Control |
| RNC | Radio Network Controller |
| RR | Rate Request |
| RRC | Radio Resource Control |
| TFC | Transport Format Combination |
| TTI | Transmission Time Interval |
| UE | User Equipment, a mobile station |
| UL | uplink |

TECHNOLOGICAL BACKGROUND

A communication system is a facility that enables communication between two or more entities such as user terminal equipment and/or network entities and other nodes associated with a communication system. The communication may comprise, for example, communication of voice, electronic mail (email), text messages, data, multimedia and so on.

The communication may be provided by fixed line and/or wireless communication interfaces. A feature of wireless communication systems is that they provide mobility for the users thereof. An example of a communication system providing wireless communication is a public land mobile network (PLMN). An example of the fixed line system is a public switched telephone network (PSTN).

A cellular telecommunication system is a communications system that is based on the use of radio access entities and/or wireless service areas. The access entities are typically referred to as cells. Examples of cellular telecommunication standards includes standards such as GSM (Global System for Mobile communications), GPRS (General Packet Radio Servers), AMPS (American Mobile Phone System), DAMPS (Digital AMPS), WCDMA (Wideband Code Division Multiple Access), UMTS (Universal Mobile Telecommunication System) and CDMA 2000 (Code Division Multiple Access 2000).

A communication system typically operates in accordance with a given standard or specification which sets out what the various elements of a system are permitted to do and how that should be achieved. For example, the standard of specification may define if the user, or more precisely user equipment is provided with a circuit switched service or a packet switched service or both. Communication protocols and/or parameters which should be used for the connection are also typically defined. For example, the manner in which communication shall be implemented between the user equipment and the elements of the communication network is typically based in a predefined communication protocol. In other words, a specific set of "rules" on which the communication can be based needs to be defined to enable the user equipment to communicate via the communication system.

At the time of writing of this patent application, enhancements of the uplink DCH (Enhanced DCH, EDCH) are being standardized for packet data traffic for release 6 of the 3GPP standards. Some of the associated 3GPP standards are at least (but not limited to) the following: 3GPP TR 25.896, 3GPP TR 25.808, and 3GPP TS 25.309.

Enhancements are reached according to currently discussed standard versions by distributing some of the packet scheduler functionality to the Node B network nodes in order to have faster scheduling of bursty non real-time traffic than the layer 3 mechanisms in RNC facilitate. The idea is that with faster link adaptation it is possible to more efficiently share the uplink power resources between packet data users: when packets have been transmitted from one user the scheduled resource can be made available immediately to another user. This avoids the peaked variability of noise rise, when high data rates are being allocated to users running bursty high data-rate applications.

In the currently specified architecture, the packet scheduler is located in the RNC and therefore is limited in its ability to adapt to the instantaneous traffic, because of bandwidth and delay constraints on the RRC signalling interface between the RNC and the UE. Hence, to accommodate the variability, the packet scheduler must be conservative in allocating uplink power to take into account the influence from inactive users in the following scheduling period—a solution which turns out to be spectrally inefficient for high allocated data rates and long release timer values.

In current specifications for EDCH, much of the packet scheduler functionality is transferred to the Node B, i.e. there is a Node B scheduler that takes care of allocating uplink resources. For transmission of data, the UE selects a E-TFC that suits the amount of data to be transmitted in its RLC buffer, subject to constraints on the maximum transmission power of the UE and the maximum allowed power. If needed, UE can request for higher bit rate by sending Rate Request messages (RR) in the uplink, and the Node B decides whether to grant or not additional resources by answering with rate grant messages in the downlink. The grant messages are of two kinds: Relative Grants (RG) and Absolute Grant (AG). Relative grants are relative to the actual used resource by the UE. The absolute grant allocates resources to the UE in an absolute manner in terms of power. When to use AG or RG to adjust the resources allocated to the UE is fully subject to the decision done in the network. The AG and RG messages are transmitted in the downlink using specific physical channels designed for this purpose, namely E-AGCH and E-RGCH.

Also the current EDCH specifications bring a similar L1/MAC layer HARQ retransmission mechanism between UE and Node B in the uplink as in HSDPA for the downlink. The fast HARQ is be based on N-process SAW (Stop-And-Wait) HARQ, where HARQ combining is performed at Node B L1 (layer 1). For the 2 ms TTI (transmission time interval), 8 SAW HARQ processes are defined in the current standard versions, and for the 10 ms TTI 4 processes are defined in the current standard versions.

According to certain current proposals, each HARQ process is to be scheduled independently for the 2 ms TTI. There is a fixed timing relationship between the DL (downlink) and the UL (uplink) which tells to which HARQ process the received AG or RG command (AG/RG) applies as shown in FIG. 1. For each AG or RG command received, the UE knows exactly to which HARQ process it applies due to the known timing relationship.

These proposals have certain problems. For example, scheduling each HARQ process independently requires a lot of signalling and can be considered more susceptible to signalling errors.

It has been proposed to have an 8 bit process allocation string defined at Layer 3: each bit tells whether the UE is allowed to transmit in uplink for that particular HARQ process or not. This known proposal would enable considering the scheduling commands applicable to all active HARQ retransmission processes and thus reduce required amount of signalling and susceptibility to signalling errors and still have the means for the network to control which HARQ retransmission processes are allowed to transmit. However, layer 3 signalling is too slow to allow a fast activation. Besides the Node B scheduler is located at Layer 2 in the Node B. Interaction with Layer 3 at RNC for scheduling issues is not optimal.

SUMMARY OF THE INVENTION

Embodiments of the present invention aim to overcome one or several of the above problems.

According to a first aspect of the invention, a method for controlling transmission over a wireless communication link is provided. The method comprises the step of indicating on a transmission resource control channel whether a retransmission process should be activated or deactivated.

The transmission resource control channel can be an E-AGCH channel.

In the method, a bit transmitted on a transmission resource control channel can indicate that a corresponding retransmission process should be activated if the process is not active, and deactivated if the process is active.

In the method, a bit transmitted on a transmission resource control channel can indicate whether a predefined group of other bits on the transmission resource control channel indicate a transmission resource grant or whether the predefined group of other bits on the transmission resource control channel carry retransmission process activation commands.

In the method, a group of bits transmitted on the transmission resource control channel can indicate that a retransmission process should change state.

In the method, a group of bits transmitted on the transmission resource control channel can indicate a retransmission process state or state change for a specific retransmission process and a retransmission process state or state change for other retransmission processes.

The step of indicating can be performed by a wireless network node such as a Node B or a base station.

According to another aspect of the invention, a mobile station for a wireless communication network is provided. The mobile station comprises a receiver for receiving a transmission resource control channel, means for receiving retransmission process control information from the transmission resource control channel, and a controller for activating and deactivating retransmission processes as a response to retransmission process control information received by the means for receiving control information. The transmission resource control channel can be an E-AGCH channel.

According to a further aspect of the invention, a network node for a wireless communication network is provided. The network node comprises a transmitter for transmitting a transmission resource control channel to mobile stations, and means for embedding retransmission process control information in data frames transmitted on the transmission resource control channel.

The network node can be a Node B network node.
The network node can be a base station.

BRIEF DESCRIPTION OF THE DRAWINGS

Embodiments of the present invention will now be described by way of example with reference to the accompanying drawings, in which.

DETAILED DESCRIPTION OF EMBODIMENTS

Figure 1:
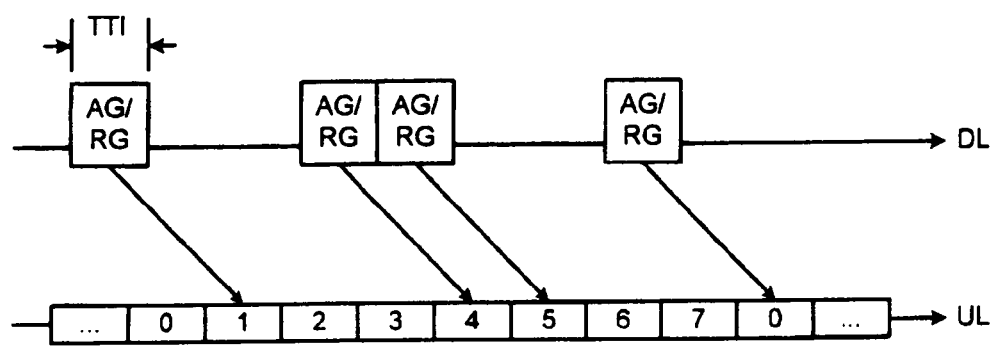
FIG. 1 illustrates timing relationships between transmission resource access grants and HARQ processes according to prior art.
Figure 2:
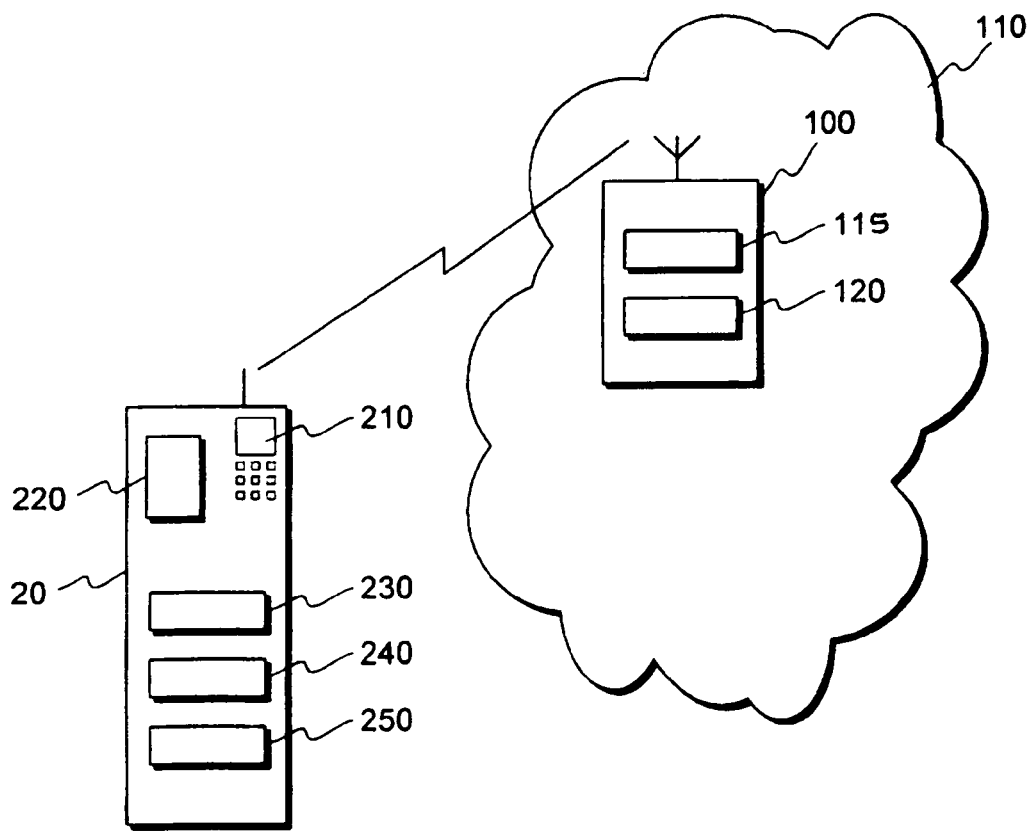
FIG. 2 illustrates a mobile station and a network element according to an embodiment of the invention.

FIG. 2 illustrates a mobile station 20 and a network node 100 of a wireless communication system 110 according to an embodiment of the invention.

The mobile station has a user interface 210 which can be for example a display and a keyboard, a processor 220, a receiver 230 for receiving a transmission resource control channel, means 240 for receiving retransmission process control information from the transmission resource control channel, and a controller 250 for activating and deactivating retransmission processes as a response to retransmission process control information received by the means for receiving control information. Various components can be implemented using software program code executed in the processor 220 of the mobile station. For example, the means 240 for receiving retransmission process control information can be implemented as software program code which is adapted to extract retransmission process control information from an incoming data flow of a transmission resource control channel.

The transmission resource control channel can be for example an E-AGCH channel.

The network node 100 comprises a transmitter 115 for transmitting a transmission resource control channel to mobile stations, and means 120 for embedding retransmission process control information in data frames transmitted on the transmission resource control channel.

The network node can be for example a Node B network node. If the particular wireless network in which an embodiment of the invention is implemented does not have the concept of a Node B, the network node can be a base station.

The basic idea underlying the invention is to use a layer 1 mechanism for HARQ retransmission process activation, using a transmission resource control channel as a signalling channel. The transmission resource control channel can advantageously be the E-AGCH channel, or for example the E-RGCH channel.

According to an embodiment of the invention, certain bits in the transmission resource control channel are used to signal whether one or more HARQ processes should be activated or deactivated.

In one embodiment of the invention, a bit transmitted on the transmission resource control channel is used to indicate to an UE (a mobile station) whether a particular HARQ process should be activated or deactivated. This embodiment depends on a well-defined timing relation between UL and DL, which allows the UE to relate the indicating bit transmitted on the transmission resource control channel to a particular HARQ process. As a result, one bit per process is required in the transmission resource control channel to tell the UE whether a particular HARQ process should be activated or de-activated.

Figure 3:
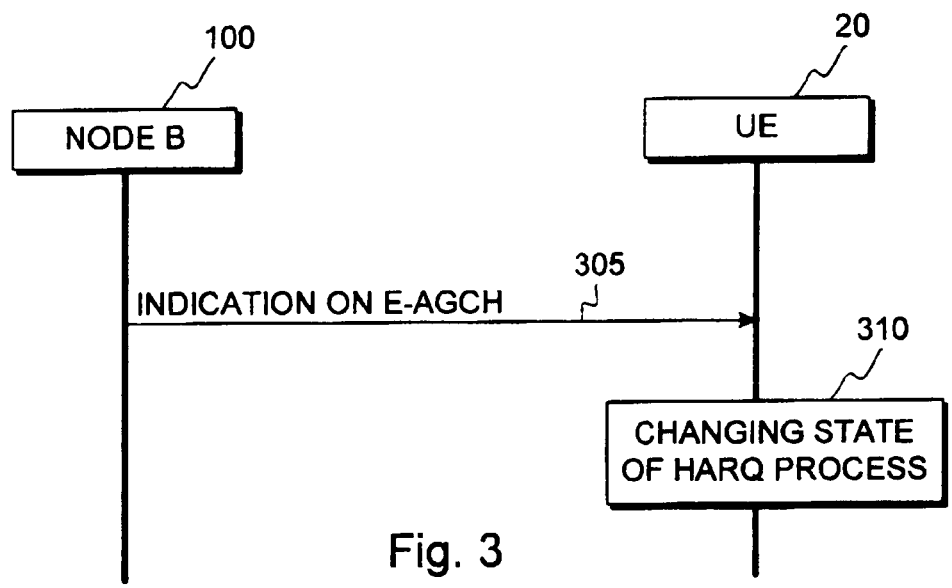
FIG. 3 illustrates signalling between a Node B and a mobile station.

FIG. 3 illustrates signalling in an exemplary embodiment of the invention. FIG. 3 illustrates signalling between a Node B network node 100 and a mobile station (UE) 20. In step 305 Node B transmits an indication that a particular HARQ process should change state. In step 310 the UE changes the state of i.e. activates or deactivates the HARQ process.

In a further embodiment, a bit on the transmission resource control channel denotes how a predefined number of other bits on the transmission resource control channel are to be interpreted. For example, if that specific bit is set to one value (such as 0), the related bits of the transmission resource control channel have their prior art meaning related to specifying an absolute (or relative) transmission resource grant. If that specific bit is set to another value (such as 1) the related bits of the transmission resource control channel carry HARQ retransmission process activation commands; for example, whether each of a corresponding number of HARQ processes should be activated or deactivated.

Figure 4:
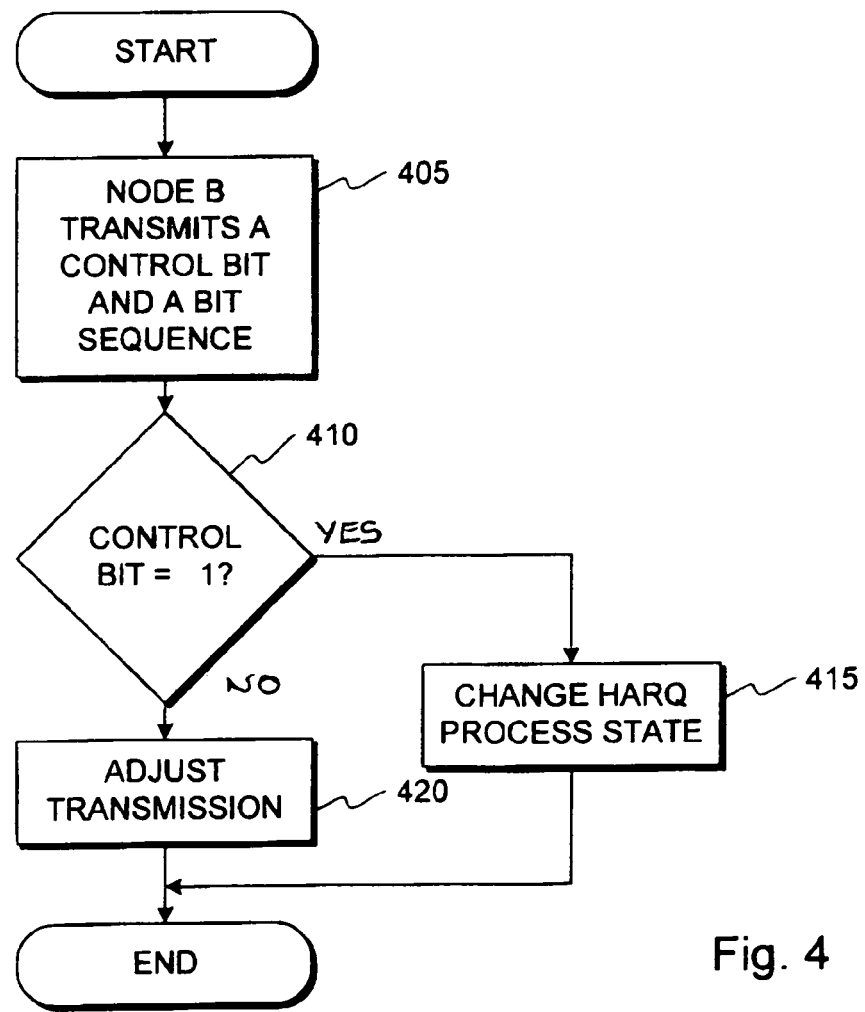
FIG. 4 illustrates signalling and process control between a Node B and a mobile station.

FIG. 4 illustrates signalling and HARQ process control an exemplary embodiment of the invention. In step 405, a Node B transmits a control bit and a bit sequence on an E-AGCH channel. In step 410 the mobile station (UE) determines whether the control bit is set to 1. If the control bit was set to 1, the mobile station interprets the received bit sequence as HARQ process control commands and adjusts at least one HARQ process accordingly in step 415. If the control bit was set to 0, the mobile station interprets the received bit sequence as a transmission resource grant and adjusts its transmissions accordingly in step 420.

In a still further embodiment of the invention, a group of bits on the transmission resource control channel are used to indicate which HARQ process should change state. In a system having 8 HARQ retransmission processes, 3 bits can be used in the transmission resource control channel to indicate whether the corresponding HARQ process should toggle its state: if it was activated it should be de-activated; and if it was de-activated it should be activated.

According to a further embodiment of the invention, a group of bits on the transmission resource control channel have specified meaning as to whether a specific HARQ process is to be activated or deactivated, and/or whether all other HARQ processes are to be deactivated or activated. For example, a group of two bits can specify the following:

| bit 1 | bit 2 | meaning |
| --- | --- | --- |
| 0 | 0 | activate all processes |
| 0 | 1 | activate all processes |
| 1 | 0 | deactivate this process |
| 1 | 1 | activate this process |

The meaning of the group of bits can be specified in many different ways. For example, in another embodiment, a group of two bits can specify the following:

| bit 1 | bit 2 | meaning |
| --- | --- | --- |
| 0 | 0 | activate all processes |
| 0 | 1 | activate this process and deactivate all other processes |
| 1 | 0 | activate this process |
| 1 | 1 | deactivate this process |

In a further embodiment, certain bits transmitted in the transmission resource control channel can indicate, whether AG and/or RG commands relate to a single HARQ process or to all HARQ processes. For example, certain values of a group of bits specifying activity states of one or more HARQ processes may indicate that following AG and/or RG commands apply to all active HARQ processes.

The invention has certain advantages. For example, the invention allows fast activation of HARQ processes, allowing Node B to control the activation of the HARQ processing. This allows fast accommodation to variability in transmission resource needs, as the Node B scheduler is according to current 3GPP standard versions also located in the Node B.

The signalling bits for controlling HARQ retransmission processes as described in this specification can be encoded and signalled in a transmission resource control channel in many different ways among other messages in the transmission resource control channel. Many different ways of encoding and signalling the bits can be devised by a man skilled in the art, and the invention is not limited to any specific messaging structure for carrying such bits.

The invention also provides a mobile station (UE) capable of receiving transmission control information within a transmission resource control channel and controlling HARQ retransmission processes based on the received transmission control information as described in the previous paragraphs.

The invention also provides a communication network element capable of transmitting transmission control information within a transmission resource control channel in order to control uplink HARQ retransmission processes in a mobile station (UE).

It is noted that while the preceding description illustrates various embodiments of the invention within a 3G cellular telecommunications system, the invention is not limited to a so called 3G cellular system, but can be implemented in different types of cellular telecommunication systems as well.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   determining, in a network node, whether at least a HARQ (Hybrid-Automatic-Repeat-Request) process of a multiplicity of HARQ processes should be activated or deactivated in a mobile station, wherein each HARQ process is responsible for generating positive or negative acknowledgements indicating delivery status of transmissions over a data channel so that, when the HARQ process is deactivated, the HARQ process does not send or process said acknowledgments, and
   transmitting an indication associated with said determining from the network node to the mobile station on a transmission resource control channel, wherein the transmission resource control channel is an enhanced absolute grant channel,
   wherein said indication is distinct from said positive or negative acknowledgements, and includes:
   a group of bits that has a specific value indicating that a specific HARQ process is to be activated or deactivated, and a specific value indicating that all HARQ processes are to be activated.

2. A method according to claim 1, wherein a bit transmitted on the transmission resource control channel indicates that a corresponding hybrid-automatic-repeat-request process should be activated if the hybrid-automatic-repeat-request process is not active, and deactivated if the hybrid-automatic-repeat-request process is active.

3. A method according to claim 1, wherein a bit transmitted on the transmission resource control channel indicates whether a predefined group of other bits on the transmission resource control channel indicate a transmission resource grant or whether the predefined group of other bits on the transmission resource control channel carry hybrid-automatic-repeat-request process activation commands.

4. A method according to claim 1, wherein a group of bits transmitted on the transmission resource control channel indicates that a hybrid-automatic-repeat-request process should change states.

5. A method according to claim 1, wherein a group of bits transmitted on the transmission resource control channel indicates a hybrid-automatic-repeat-request process state or state change for a specific hybrid-automatic-repeat-request process and a hybrid-automatic-repeat-request process state, or state change for other hybrid-automatic-repeat-request processes.

6. A method according to claim 1, wherein the determining is performed by a wireless network node.

7. An apparatus, comprising:
at least one processor; and
at least one memory including computer program code,
the at least one memory and the computer program code configured, with the at least
one processor, to cause the apparatus at least to
receive a transmission resource control channel;
receive an indication associated with a determination of whether at least a HARQ (Hybrid-Automatic-Repeat-Request) process of a multiplicity of HARQ processes should be activated or deactivated, wherein each HARQ process is responsible for generating positive or negative acknowledgments indicating delivery status of transmissions over a data channel so that, when the HARQ process is deactivated, the HARQ process does not send or process said acknowledgments, and
control activating and deactivating at least a HARQ process in response to the received indication,
wherein said indication is distinct from said positive or negative acknowledgements,
wherein the transmission resource control channel is an enhanced absolute grant channel.

8. An apparatus, comprising:
at least one processor: and
at least one memory including computer program code,
the at least one memory and the computer program code configured, with the at least
one processor, to cause the apparatus at least to
transmit a transmission resource control channel to mobile stations; and
embed an indication associated with a determination of whether at least a HARQ (Hybrid-Automatic-Repeat-Request) process of a multiplicity of HARQ processes should be activated or deactivated, wherein each HARQ process is responsible for generating
positive or negative acknowledgements indicating delivery status of transmissions over a data channel so that, when the HARQ process is deactivated, the HARQ does not send or process said acknowledgments,
said indication being distinct from said positive or negative acknowledgements,
wherein the transmission resource control channel is an enhanced absolute grant channel.

9. An apparatus according to claim 8, wherein the apparatus is a Node B network node.

10. An apparatus according to claim 8, wherein the apparatus is a base station.

11. An apparatus, comprising:
a receiver configured to receive a transmission resource control channel;
a hybrid-automatic-repeat-request process control information receiver configured to receive an indication associated with a determination of whether at least a HARQ (Hybrid-Automatic-Repeat-Request) process of a multiplicity of HARQ processes should be activated or deactivated, wherein each HARQ process is responsible for generating positive or negative acknowledgements indicating delivery status of transmissions over a data channel so that, when the HARQ process is deactivated, the HARQ process does not send or process such acknowledgments, said indication being distinct from said positive or negative acknowledgements; and
a controller configured to activate and deactivate HARQ processes in response to the indication received by the hybrid-automatic-repeat-request process control information receiver,
wherein the transmission resource control channel is an enhanced absolute grant channel.

12. A method, comprising:
receiving a transmission resource control channel;
receiving an indication associated with a determination of whether at least a HARQ (Hybrid-Automatic-Repeat-Request) process of a multiplicity of HARQ processes should be activated or deactivated, wherein each HARQ process is responsible for generating positive or negative acknowledgements indicating delivery status of transmissions over a data channel so that, when the HARQ process is deactivated, the HARQ process does not send or process said acknowledgments, said indication being distinct from said positive or negative acknowledgements; and
activating or deactivating HARQ processes in response to the indication,
wherein the transmission resource control channel is an enhanced absolute grant channel.

13. A method, comprising:
transmitting a transmission resource control channel to a mobile station; and
embedding an indication associated with a determination of whether at least a HARQ (Hybrid-Automatic-Repeat-Request) process of a multiplicity of HARQ processes should be activated or deactivated, wherein each HARQ process is responsible for generating
positive or negative acknowledgements indicating delivery status of transmissions over a data channel so that, when the HARQ process is deactivated, the HARQ process does not send or process said acknowledgments,
wherein said indication is distinct from said positive or negative acknowledgements, and includes:
a group of bits that has a specific value indicating that a specific HARQ process is to be activated or deactivated, and a specific value indicating that all HARQ processes are to be activated, and
wherein the transmission resource control channel is an enhanced absolute grant channel.

14. A method, comprising:
determining, in a network node, whether at least a HARQ (Hybrid-Automatic-Repeat-Request) process of a multiplicity of HARQ processes should be activated or deactivated in a mobile station, wherein each HARQ process is responsible for generating positive or negative acknowledgements indicating delivery status of transmissions over a data channel so that, when the HARQ process is deactivated, the HARQ process does not send or process said acknowledgments, and transmitting an indication associated with said determining from the network node to the mobile station on a transmission resource control channel, wherein said indication is distinct from said positive or negative acknowledgements, and the transmission resource control channel is an enhanced absolute grant channel, wherein said indication relates to the meaning of a predefined number of bits on the transmission resource control channel, wherein said indication includes at least two values, a first value indicating that said predefined number of bits are related to transmission resource grant, and a second value related to hybrid-automatic-repeat-request activation and/or deactivation commands.

15. A method, comprising:

determining, in a network node, whether at least a HARQ (Hybrid-Automatic-Repeat-Request) process of a multiplicity of HARQ processes should be activated or deactivated in a mobile station, wherein each HARQ process is responsible for generating positive or negative acknowledgements indicating delivery status of transmissions over a data channel so that, when the HARQ process is deactivated, the HARQ process does not send or process said acknowledgments, and transmitting an indication associated with said determining from the network node to the mobile station on a transmission resource control channel, wherein said indication is distinct from said positive or negative acknowledgements, and includes a group of bits that has a specific value indicating that a specific HARQ process is to be activated or deactivated, and a specific value indicating that all HARQ processes are to be activated, wherein the transmission resource control channel is an enhanced relative grant channel.

\* \* \* \* \*